US009787172B2

(12) United States Patent
Luo et al.

(10) Patent No.: US 9,787,172 B2
(45) Date of Patent: Oct. 10, 2017

(54) METHODS AND SYSTEMS FOR IMPLEMENTING ADAPTIVE FET DRIVE VOLTAGE OPTIMIZATION FOR POWER STAGES OF MULTI-PHASE VOLTAGE REGULATOR CIRCUITS

(71) Applicants: Shiguo Luo, Austin, TX (US); Ralph H. Johnson, Round Rock, TX (US)

(72) Inventors: Shiguo Luo, Austin, TX (US); Ralph H. Johnson, Round Rock, TX (US)

(73) Assignee: Dell Products LP, Round Rock, TX (US)

( * ) Notice: Subject to any disclaimer, the term of this patent is extended or adjusted under 35 U.S.C. 154(b) by 428 days.

(21) Appl. No.: 14/470,455

(22) Filed: Aug. 27, 2014

(65) Prior Publication Data

US 2015/0370295 A1 Dec. 24, 2015

Related U.S. Application Data (60) Provisional application No. 62/014,478, filed on Jun. 19, 2014.

(51) Int. Cl.
*H02M 1/084* (2006.01)
*H02M 3/157* (2006.01)
*H02M 1/08* (2006.01)
*H02M 3/158* (2006.01)
*G06F 1/26* (2006.01)

(52) U.S. Cl.
CPC ............. *H02M 1/084* (2013.01); *H02M 1/08* (2013.01); *H02M 3/157* (2013.01); *H02M 3/1584* (2013.01); *G06F 1/26* (2013.01)

(58) Field of Classification Search
CPC ......... G06F 1/26; H02M 3/157; H02M 3/158; H02M 1/08; H02M 3/1584
USPC ................................ 323/271, 272, 282, 285
See application file for complete search history.

(56) References Cited

U.S. PATENT DOCUMENTS

| | | | |
|---|---|---|---|
| 6,346,801 B1 | 2/2002 | Zafarana et al. | |
| 7,265,601 B2 | 9/2007 | Ahmad | |
| 7,673,157 B2* | 3/2010 | Chapuis | G06F 1/329 323/371 |
| 7,999,520 B2 | 8/2011 | Luo et al. | |
| 8,125,200 B2 | 2/2012 | Tsai et al. | |
| 8,570,006 B2 | 10/2013 | Moussaoui et al. | |
| 8,957,658 B2 | 2/2015 | Nakamura et al. | |
| 9,000,786 B2 | 4/2015 | Luo et al. | |
| 9,444,338 B1 | 9/2016 | Pastorina et al. | |
| 9,647,543 B2* | 5/2017 | Luo | H02M 3/1584 |
| 2005/0073288 A1* | 4/2005 | Harris | H02M 3/1584 323/282 |

(Continued)

OTHER PUBLICATIONS

Rahardjo et al., "Systems and Methods of Current Sense Calibration for Voltage Regulator Circuits", U.S. Appl. No. 14/449,949, filed Aug. 1, 2014, 43 pgs.

(Continued)

*Primary Examiner* — Kyle J Moody
(74) *Attorney, Agent, or Firm* — Egan Peterman Enders Huston (57) ABSTRACT

Methods and systems are disclosed that may be employed to implement adaptive FET drive voltage optimization for voltage regulator (VR) integrated power stages (IPstages) that have different MOSFET RDS(on) characteristics to improve VR efficiency and current-sense accuracy.

17 Claims, 7 Drawing Sheets

(56) References Cited

U.S. PATENT DOCUMENTS

| | | | |
|---|---|---|---|
| 2006/0190532 A1 | 8/2006 | Chadalavada | |
| 2006/0212143 A1 | 9/2006 | Nguyen et al. | |
| 2009/0153110 A1* | 6/2009 | Huang | H02M 3/1584 323/271 |
| 2010/0225287 A1* | 9/2010 | Schultz | H02J 3/1842 323/272 |
| 2010/0277151 A1 | 11/2010 | Tsai et al. | |
| 2012/0275610 A1 | 11/2012 | Lambert et al. | |
| 2012/0324246 A1 | 12/2012 | Rahardjo et al. | |
| 2013/0057239 A1* | 3/2013 | Kalje | H02M 3/1584 323/271 |
| 2013/0207630 A1 | 8/2013 | Rahardjo et al. | |
| 2013/0265022 A1* | 10/2013 | Ulbrich | H02M 3/1584 323/282 |
| 2013/0278234 A1* | 10/2013 | Krellner | H02M 3/1584 323/282 |
| 2013/0318371 A1 | 11/2013 | Hormuth | |
| 2014/0082236 A1 | 3/2014 | Zhang et al. | |
| 2014/0232420 A1 | 8/2014 | Luo et al. | |
| 2015/0188425 A1 | 7/2015 | Chang et al. | |

OTHER PUBLICATIONS

System Power States, Printed From Internet Aug. 25, 2014, 2 pgs.

Intel, "$2^{nd}$ Generation Intel Core Processor Family Mobile With ECC", Datasheet Addendum, May 2012, 42 pgs.

Richards et al., "Calibration of Voltage Regulator", U.S. Appl. No. 14/334,122, filed Jul. 17, 2014, 32 pgs.

Luo et al., "Methods and Systems for Calibration of Voltage Regulator Systems with Multiple Types of Power Stages", U.S. Appl. No. 14/470,217, filed Aug. 27, 2014, 38 pgs.

Luo et al., "Methods and Systems for Improving Light Load Efficiency for Power Stages of Multi-Phase Voltage Regulator Circuits", U.S. Appl. No. 14/470,344, filed Aug. 27, 2014, 38 pgs.

* cited by examiner

METHODS AND SYSTEMS FOR IMPLEMENTING ADAPTIVE FET DRIVE VOLTAGE OPTIMIZATION FOR POWER STAGES OF MULTI-PHASE VOLTAGE REGULATOR CIRCUITS

This application claims the benefit of U.S. Provisional Patent Application Ser. No. 62/014,478, filed on Jun. 19, 2014 and entitled "Methods And Systems For Implementing Adaptive FET Drive Voltage Optimization For Power Stages Of Multi-Phase Voltage Regulator Circuits", which is incorporated herein by reference in its entirety for all purposes.

The present application is related in subject matter to concurrently filed patent application Ser. No. 14/470,217 entitled "METHODS AND SYSTEMS FOR CALIBRATION OF VOLTAGE REGULATOR SYSTEMS WITH MULTIPLE TYPES OF POWER STAGES" by Luo et al., and to concurrently filed patent application Ser. No. 14/470,344 entitled "METHODS AND SYSTEMS FOR IMPROVING LIGHT LOAD EFFICIENCY FOR POWER STAGES OF MULTI-PHASE VOLTAGE REGULATOR CIRCUITS" by Luo et al., which is incorporated herein by reference in its entirety.

FIELD OF THE INVENTION

This application relates to information handling systems, and more particularly to multi-phase voltage regulator (VR) circuitry.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

High current information handling system loads, such as for CPUs and memory, typically require multi-phase voltage regulators (VRs). An integrated power stage (IPstage) of each VR phase is an integrated circuit that is usually composed of a MOSFET (metal oxide semiconductor field effect transistor) driver, a high-side MOSFET, and a low-side MOSFET. In addition to an IPstage, a VR phase also usually includes an inductor with all the phase inductors being tied together at their output. One example of a multi-phase VR architecture may be found in U.S. Pat. No. 7,999,520.

Figure 1:
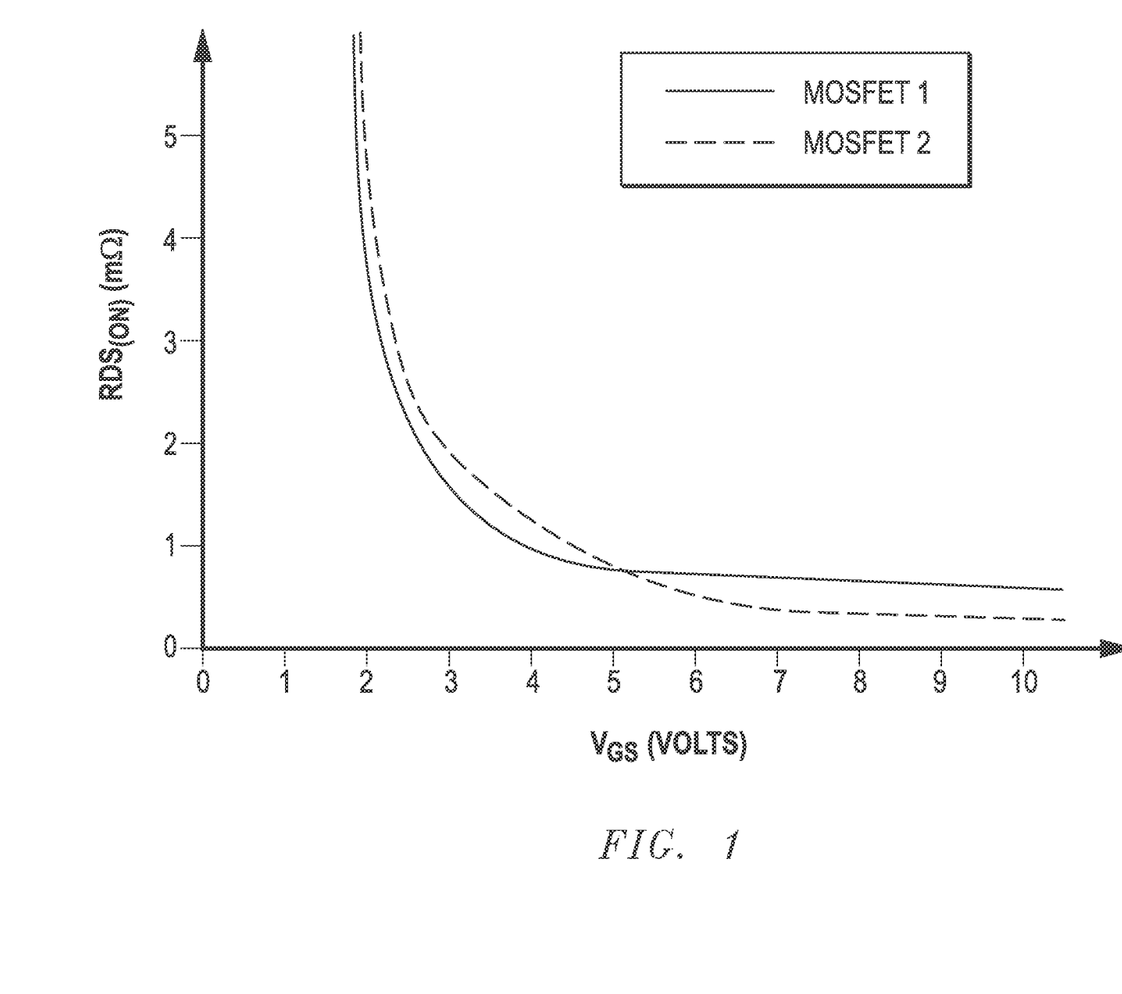
FIG. 1 illustrates MOSFET RDS(on) as a function of gate drive voltage ($V_{GS}$).

Generally, each MOSFET supplier for integrated power stages uses a different silicon process for fabrication. Different silicon processes result in a different MOSFET drain to source resistance in on-state or RDS(on) characteristics as a function of gate drive voltage, i.e., gate-to-source voltage ($V_{GS}$). As illustrated in FIG. 1, at a given temperature, a MOSFET 1 device from a first supplier may exhibit a RDS(on) versus $V_{GS}$ curve that enters a relatively flat region after $V_{GS}$=5 volts while a greater $V_{GS}$ of about 6 volts is required before a MOSFET 2 device from a second supplier enters a relatively flat region of RDS(on) versus $V_{GS}$. Thus, voltage regulator (VR) efficiency using MOSFET 1 device won't benefit from a greater gate voltage (e.g., 5 volts) because RDS(on) will remains almost the same at higher voltages, but gate switching loss may be significantly increased, depending on equivalent charge capacitance at the gate.

An optimized FET drive voltage in terms of better efficiency is determined mainly by the selected MOSFET RDS(on) characteristic, gate charge and switching frequency. For instance, a lower drive voltage may be considered for a higher switching frequency, lower gate charge FET and higher density design VR, or gate charge/discharge switching loss will become a significant portion of total power loss. In the past, a single VR FET drive voltage value for a given server system has been selected based on the average of different optimal FET drive voltages determined for multiple types of MOSFET devices available from different suppliers that may be employed in the VR of the server system.

Discrete power stages (separate dual FET and FET driver packages) have been traditionally used for main-stream server systems, and inductor direct current resistance (DCR) current sense is employed. Smart power stages have been used for servers. There are two categories of current sense approaches being used in IPstages, i.e., mirror FET sense and RDS(on) sense.

SUMMARY OF THE INVENTION

Disclosed herein are methods and systems that may be employed to implement adaptive FET drive voltage optimization for voltage regulator (VR) IPstages that have different FET (e.g., N-channel MOSFET) RDS(on) characteristics to improve VR efficiency and current-sense accuracy. Examples of such IPstages include those IPstages employed in a multi-phase VR used to power a system load of an information handling system such as server, desktop computer, notebook computer, PDA, cell phone, tablet computer, etc.). In one exemplary embodiment, a digital controller feature set definition may be employed to implement a scheme for adaptive FET drive voltage optimization for VR IPstages having different RDS(on) characteristics, for example, different IPstages from different suppliers and different types of IPstages (e.g., different types or models of IPstages available from a common vendor or supplier source, different types or models of IPstage available from different vendor or supplier sources, etc.) having different electrical characteristics (e.g., different MOSFET drain to source resistance in on-state or RDS(on) characteristics as a function of gate drive voltage ($V_{GS}$)) and/or current sense accuracy. Advantageously, in one exemplary embodiment both VR efficiency and current-sense accuracy may be improved or optimized for a given VR configuration to allow FET (e.g., N-channel MOSFET) devices from different suppliers to be substituted in the given VR configuration without requiring a bill of material (BOM) change to other VR components. In a further embodiment, FET drive voltage may be automatically optimized for different types of IPstages (e.g., available from different IPstage suppliers) when the IPstages are populated to a motherboard (MB) without a BOM change.

In one exemplary embodiment, the disclosed systems and methods may be implemented to allow VR FET drive voltage to be selectably varied and/or optimized based on the particular MOSFET RDS(on) characteristics for any given IPstage of a VR so as to allow individual optimization of VR FET drive voltage for different types of IPstage MOSFET devices that are actually employed in the VR. This is unlike conventional VR systems that use a single fixed averaged value of FET drive voltage for driving all types of IPstage MOSFET devices regardless of the particular MOSFET RDS(on) characteristics and/or BOM actually employed for each given VR IPstage. In this regard, the conventional use of a single fixed average VR FET drive voltage value regardless of the VR IPstage type/s actually employed means that VR efficiency is not optimized for any given type of IPstage device that may be used. This is because a conventional average value of optimum VR FET drive voltages for different types of IPstages does not represent an optimum FET drive voltage (in terms of best VR efficiency and/or better current sense accuracy) for any given one of the different type IPstages, such as may be available from a different specific suppliers.

In another exemplary embodiment, the disclosed systems and methods may also be implemented to improve VR current sense accuracy, e.g., so as to avoid production calibration. For example, in some VR configurations FET drive voltage value not only impact VR efficiency but also may impact current sense accuracy if MOSFET RDS(on) voltage is used for current sense, e.g., for smart power stages of information handling systems (such as servers) which are requiring ever increasing power efficiency and accuracy for power telemetry data. This is the case, for example, where current sense gain calibration in an IPstage is completed by trimming to a normalized RDS(on) value over automatic test equipment (ATE) test with fixed trimming bits, i.e., a smaller RDS(on) variation range is expected in fixed bits of trim program, which is translated to higher calibration resolution. In one example, smart power stages may also be used to implement VR design to achieve embedded current sense with a larger sense signal and higher power density.

In one respect, disclosed herein is a system, including: at least one integrated power stage (IPstage) including a voltage input, a voltage output, one or more field effect transistor (FET) switching devices coupled between the voltage input and the voltage output to provide regulated power to the voltage output, and an IPstage identification (ID) recognition module having a power device identification signal output that is indicative of the identity of the IPstage; at least one processing device coupled to control operation of the IPstage, the processing device also being coupled to receive the power device identification signal output from the IPstage; a power stage gate drive VR coupled between the processing device and the IPstage, the power stage gate drive VR being configured to provide a regulated gate drive voltage to drive the FET switching devices of the IPstage; and at least one processing device configured to: receive the power device identification signal output from the IPstage, determine a FET drive voltage control signal value based at least in part on the received power device identification signal, and provide the FET drive voltage control signal to control the power stage gate drive VR to provide a determined FET drive voltage to drive the FET switching devices of the IPstage while controlling the IPstage to provide power to the voltage output.

In another respect, disclosed herein is a method of operating a voltage regulator (VR) system using one or more processing devices. The method may include: using at least one processing device to control operation of at least one integrated power stage (IPstage) to provide regulated power to a voltage output of the VR system, the IPstage also including a voltage input, and one or more field effect transistor (FET) switching devices coupled between the voltage input and the voltage output; using at least one processing device to: receive a power device identification signal output from the IPstage that is indicative of the identity of the IPstage, determine a FET drive voltage control signal value based at least in part on the received power device identification signal, and provide the FET drive voltage control signal to a power stage gate drive VR; and using the power stage gate drive VR to provide a determined regulated FET drive voltage based on the FET drive voltage control signal to drive the FET switching devices of the IPstage while using the processing device to control the IPstage to provide power to the voltage output.

In another respect, disclosed herein is an information handling system, including: at least one integrated power stage (IPstage) including a voltage input, a voltage output, one or more field effect transistor (FET) switching devices coupled between the voltage input and the voltage output to provide regulated power to the voltage output, and an IPstage identification (ID) recognition module having a power device identification signal output that is indicative of the identity of the IPstage; at least one processing device configured as a VR system controller that is coupled to control operation of the IPstage, the VR controller also being coupled to receive the power device identification signal output from the IPstage; a power stage gate drive VR coupled between the VR controller and the IPstage, the power stage gate drive VR being configured to provide a regulated gate drive voltage to drive the FET switching devices of the IPstage; and at least one processing device configured to: determine a FET drive voltage control signal value based at least in part on the received power device identification signal, and provide the FET drive voltage control signal to control the power stage gate drive VR to provide a determined FET drive voltage to drive the FET switching devices of the IPstage while controlling the IPstage to provide power to the voltage output.

DESCRIPTION OF ILLUSTRATIVE EMBODIMENTS

Figure 2:
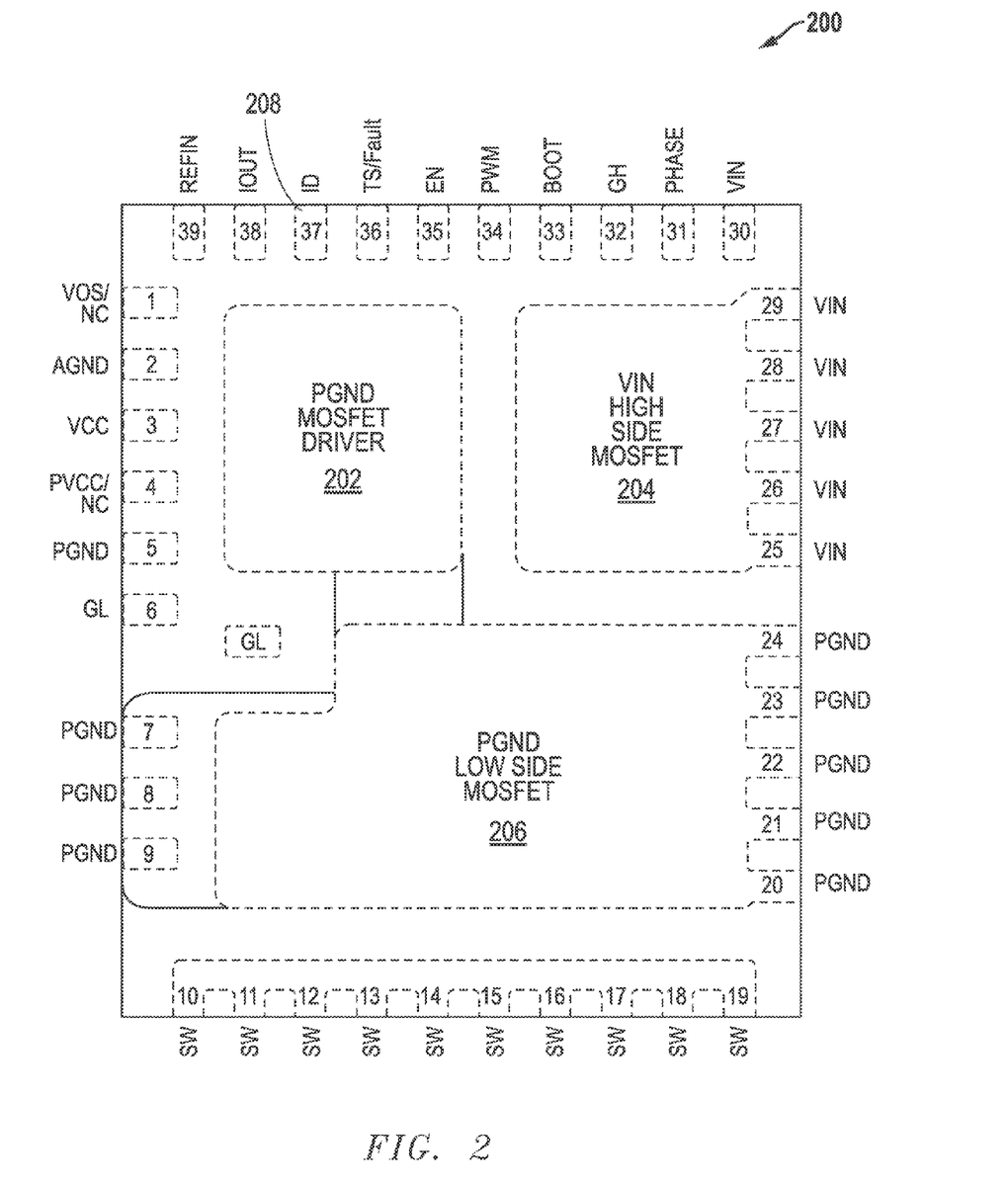
FIG. 2 illustrates a VR smart power stage footprint according to one exemplary embodiment of the disclosed methods and systems.

FIG. 2 illustrates an exemplary embodiment of the footprint of a VR smart power stage (IPstage) 200 that may be implemented in one exemplary embodiment of the disclosed methods and systems as an integrated circuit chip that includes a MOSFET driver circuit 202, high-side MOSFET circuit 204, and low-side MOSFET circuit 206. As shown, IPstage 200 includes a power device identification pin 208 that will be described further herein. A smart IPstage may also include integrated processing device logic (e.g., such as a driver logic module 315 of FIG. 3) that is capable of executing one or more tasks of IPstage 200.

Figure 3:
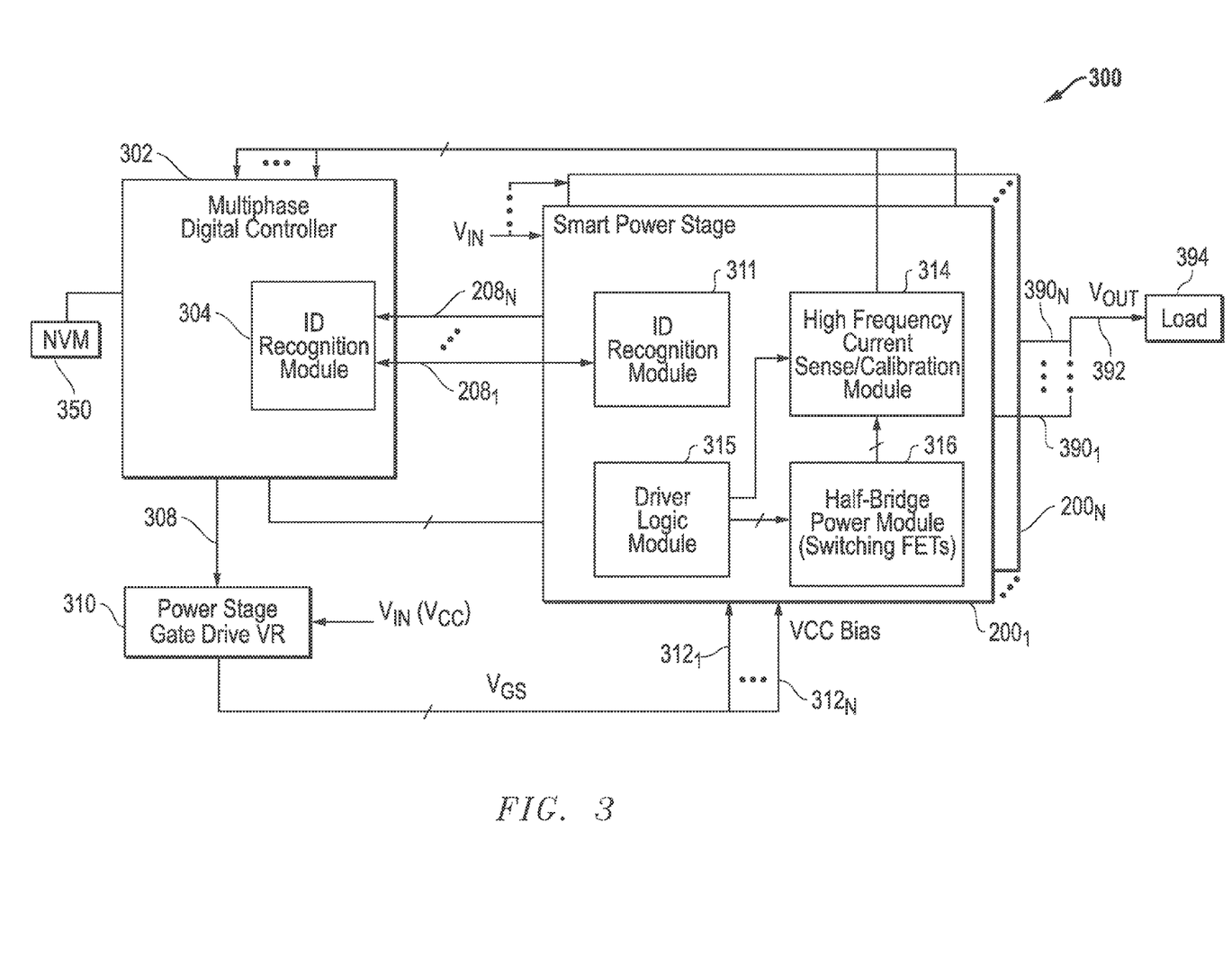
FIG. 3 illustrates a block diagram of a multi-phase VR system according to one exemplary embodiment of the disclosed methods and systems.

FIG. 3 illustrates one exemplary embodiment of a multi-phase VR system 300 as it may be implemented with multiple IPstages $200_1$ to $200_N$ coupled to at least one processing device configured as a digital VR controller 302 that may be employed to achieve adaptive FET drive voltage optimization for different types of IPstages, e.g., that each have different MOSFET RDS(on) characteristics, gate charge and/or switching frequency. In the embodiment of FIG. 3, FET drive voltage may be adaptively changed and/or optimized from one type IPstage 200 to another and different type IPstage 200 based on logic (e.g., Firmware or other suitable logic) executed by VR controller 302, e.g., without requiring a BOM change. Such different types of IPstages 200 may be available from different vendors or suppliers. Further information on VR systems and digital VR controllers may be found in U.S. Pat. No. 7,999,520 and in U.S. patent application Ser. No. 13/768,357, filed Feb. 15, 2013, each of which is incorporated herein by reference in its entirety.

As shown in FIG. 3, each IPstage 200 has a high frequency current sense/calibration module 314 and a half-bridge power module 316 that are controlled by driver logic module 315. In this embodiment, half-bridge power module 316 of each given IPstage 200 may be configured to implement high-side MOSFET circuit 204 and low-side MOSFET circuit 206 for that given IPstage 200, while high frequency calibration module 314 of each given IPstage 200 may be configured with current sensing circuitry (e.g., such as MOSFET RDS(on) current-sense circuitry, or Inductor DC Resistance sense circuitry), as well as calibration circuitry such as tuning temperature coupling coefficient, current sense gain and offset circuitry, e.g., such as described in U.S. patent application Ser. No. 14/449,949, filed Aug. 1, 2014 which is incorporated herein by reference in its entirety. Each of IPstages 200 has an individual power output 390 that is coupled to provide output current to the VR system power output 392 as shown. System power output 392 may be coupled in one embodiment to electrical load 394 such as a system load (e.g., processing devices, cooling fans, memory devices, storage devices, etc.) of an information handling system, such as server, desktop computer, notebook computer, etc.

Still referring to FIG. 3, digital VR controller 302 includes a power device identification module 304 that is configured to recognize the identity (e.g., source vendor or supplier of particular IPstage, IPstage model number, IPstage lot number, IPstage date code or other code and/or other identifier information for the particular type of installed IPstage, etc.) of each specific type of IPstage $200_1$ to $200_N$ via a respective power device identification pin signal $208_1$ to $208_N$ that is indicative of the given IPstage identity and that is provided from an ID recognition module 311 (e.g., such as through setting different voltage levels) that may be implemented as logic by a processing device integrated into each of IPstages 200 as shown. Alternatively or additionally, ID recognition module 311 may include analog circuitry configured to produce a specified voltage or current level as a power device identification pin signal 208 to VR controller 302 based on a pre-assigned IPstage ID. VR controller 302 is in turn configured to automatically select a pre-selected optimized FET drive voltage or voltage control signal value (general-purpose input/output bit value, I2C or PMBus value, etc.) based on this recognized identity, e.g., from a lookup table stored in optional non-volatile memory 350 or internal register 601 (see FIGS. 6 and 7) that is accessible by the VR controller 302. It will be understood in one embodiment that all IPstages $200_1$ to $200_N$ may be the same type of IPstage that is represented by a single power device identification pin signal 208 received by VR controller 302 from only one of IPstages 200. Alternatively, one or more of IPstages $200_1$ to $200_N$ may be a different type of IPstage from one or more other IPstages $200_1$ to $200_N$ and may be coupled to provide its own respective power device identification pin signal 208 corresponding to its particular identity to VR controller 302. Thus, it is possible that multiple sources for and types of IPstages (e.g., different types or models of IPstages available from a common vendor or supplier source, different types or models of IPstage available from different vendor or supplier sources, etc.) having different electrical characteristics and current sense accuracy may be employed in one embodiment in a common multi-phase VR system configuration.

In this exemplary embodiment, VR controller 302 may be configured to communicate the pre-selected FET drive voltage requirement via voltage control signal 308 to at least one processing device configured in this embodiment as a digital controller of an IPstage gate drive voltage regulator (VR) 310 that provides a gate drive voltage ($V_{GS}$) 312, e.g., in one embodiment configured as a VCC VR 310 (e.g., another FET_DRV POL VR) which tunes a VCC (e.g., integrated circuit input supply) bias output voltage 312 accordingly so as to supply a respective adapted (e.g., optimized) FET gate drive voltage ($V_{GS}$) $312_1$ to $312_N$ for each of IPstages $200_1$ to $200_N$ being used by motherboard VRs. Further information on gate drive VR configurations and use of gate drive voltage in VR systems may be found in U.S. Pat. No. 8,125,200, which is incorporated herein by reference in its entirety.

It will be understood in one embodiment that all IPstages $200_1$ to $200_N$ may be the same type of IPstage, in which case a processing device configured as a digital controller of gate drive VR 310 may supply the same FET drive voltage 312 to all of IPstages $200_1$ to $200_N$, e.g., based on a single power device identification pin signal 208 received by VR controller 302 from only one of IPstages 200. Alternatively, one or more of IPstages $200_1$ to $200_N$ may be a different type of IPstage from one or more other IPstages $200_1$ to $200_N$ and may be coupled to provide its own respective power device identification pin signal 208 corresponding to its particular identity, and VR controller 302 and digital controller of gate drive VR 310 configured to respond by providing a corresponding different adapted or optimized FET drive voltage 312 for each respective IPstage $200_1$ to $200_N$ that is different from other IPstages $200_1$ to $200_N$.

Figure 4:
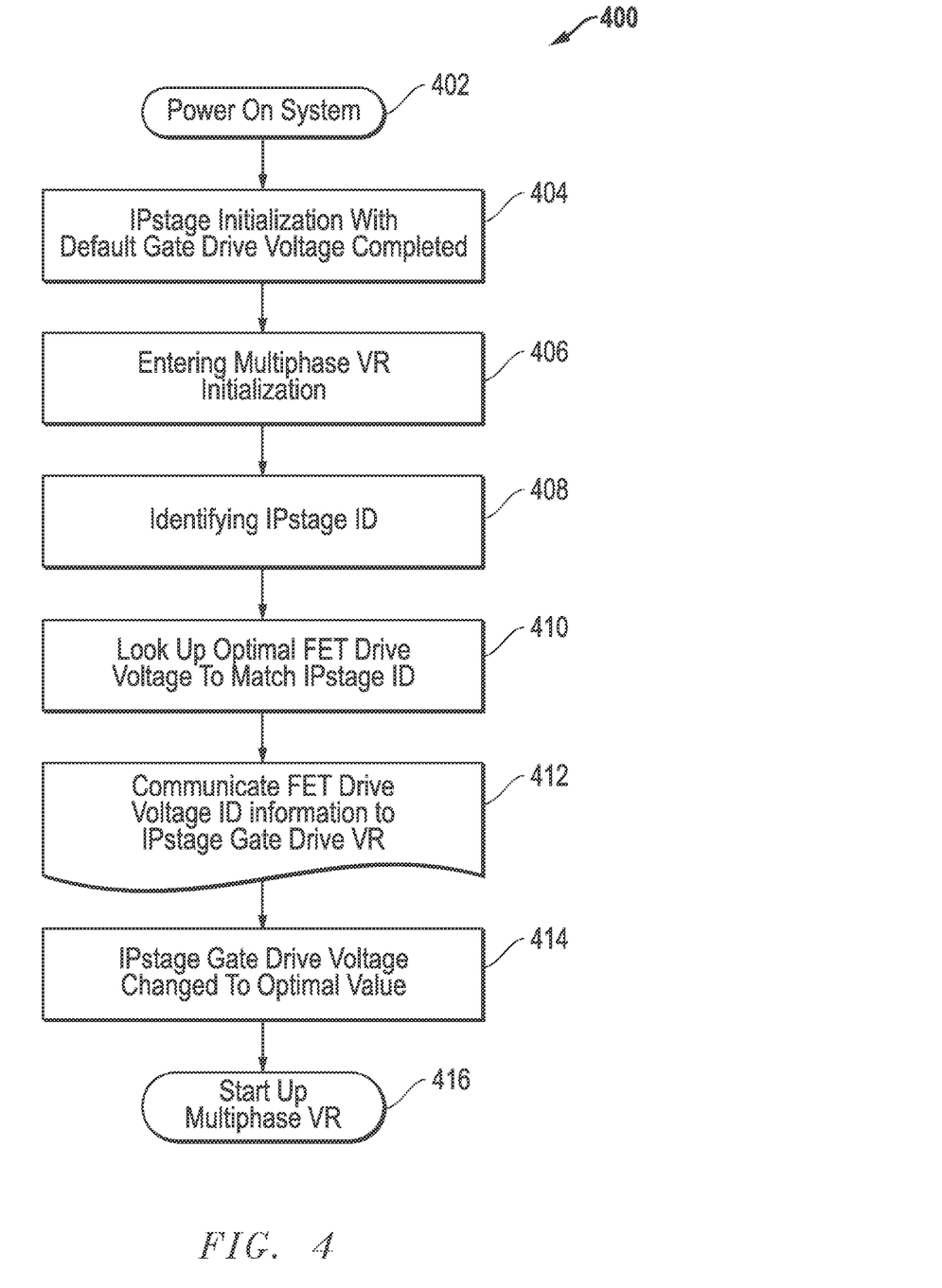
FIG. 4 illustrates a flowchart of a method for adaptive FET drive voltage optimization according to one exemplary embodiment of the disclosed methods and systems.

FIG. 4 shows a flowchart of a method 400 for adaptive FET drive voltage optimization of different types of IPstages 200, e.g., provided from different respective vendors or suppliers. In one exemplary embodiment, the steps of methodology 400 may be implemented by one or more processing devices configured as VR controller 302 and digital controller of gate drive VR 310. As shown, multi-phase VR system 300 is powered on in step 402, and methodology 400 then proceeds to step 404 where a given IPstage 200 may be initialized with a predetermined default gate drive voltage which may be based on, for example, characterization data taken on a given vendor's IPstage and/or type of IPstage. Next, in step 406 multi-phase VR system initialization is performed by VR controller 302 in which it goes through its power-on reset sequence and loads specific registers with values that are optimum for the IPstage installed. In step 408, power device identification module 304 of digital VR controller 302 may recognize the identity of the specific type of the IPstage 200 that was initialized in step 404 via its corresponding respective power device identification pin signal 208. Then in step 410, VR controller 302 determines a pre-selected (e.g., optimal) FET drive voltage value that has been assigned to the given IP stage identified in step 408, e.g., by retrieving a pre-selected value from NVM 350. VR controller 302 then provides the determined FET drive voltage value identifier information to digital controller of gate drive VR 310 in step 412, which responds by providing a VCC bias output voltage as gate drive voltage in step 414 that corresponds to the determined FET drive voltage value from step 410. Multi-phase VR system 300 then starts up in step 416 as shown.

Figure 5:
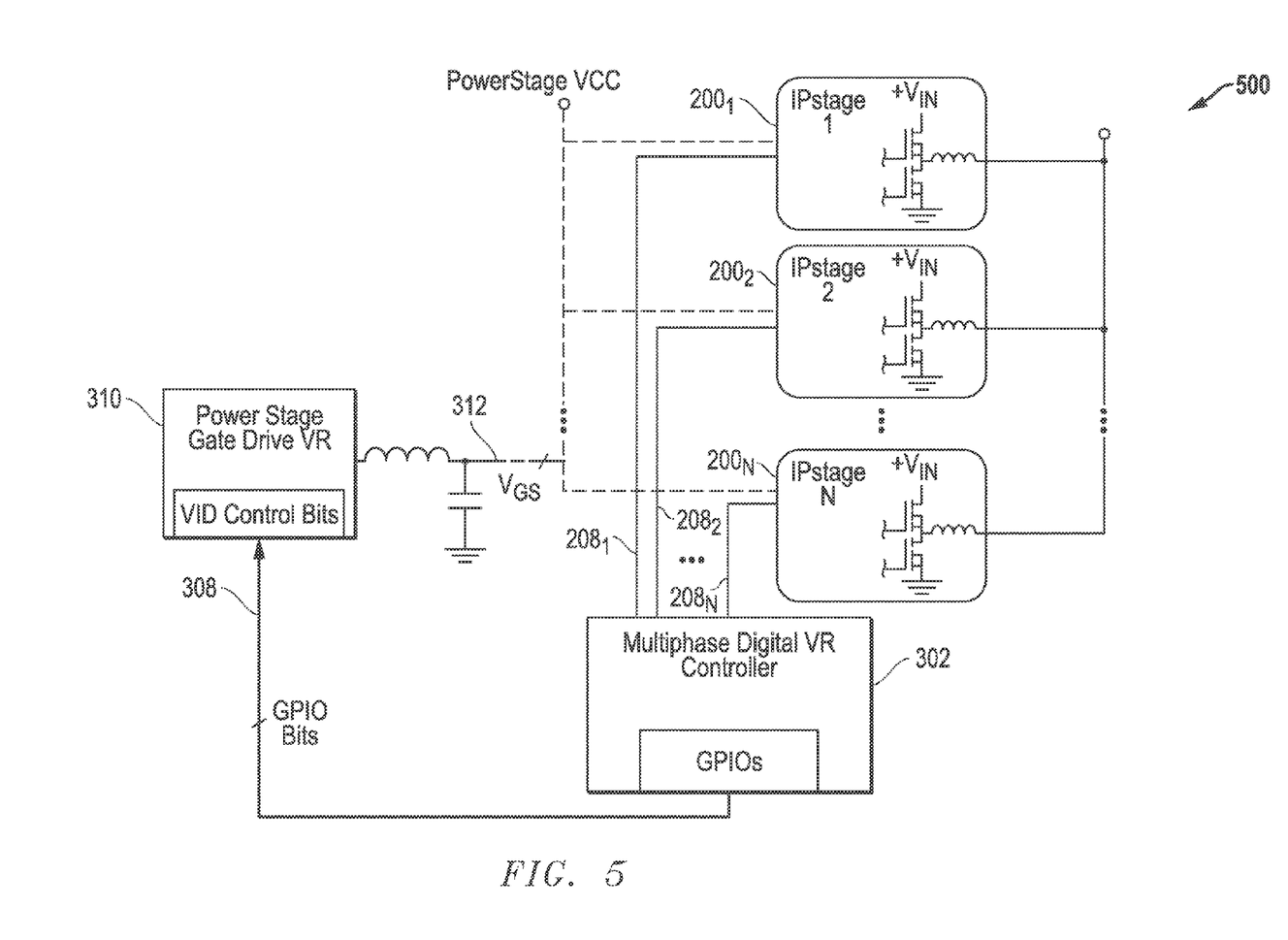
FIG. 5 illustrates a block diagram of a multi-phase VR system according to one exemplary embodiment of the disclosed methods and systems.
Figure 6:
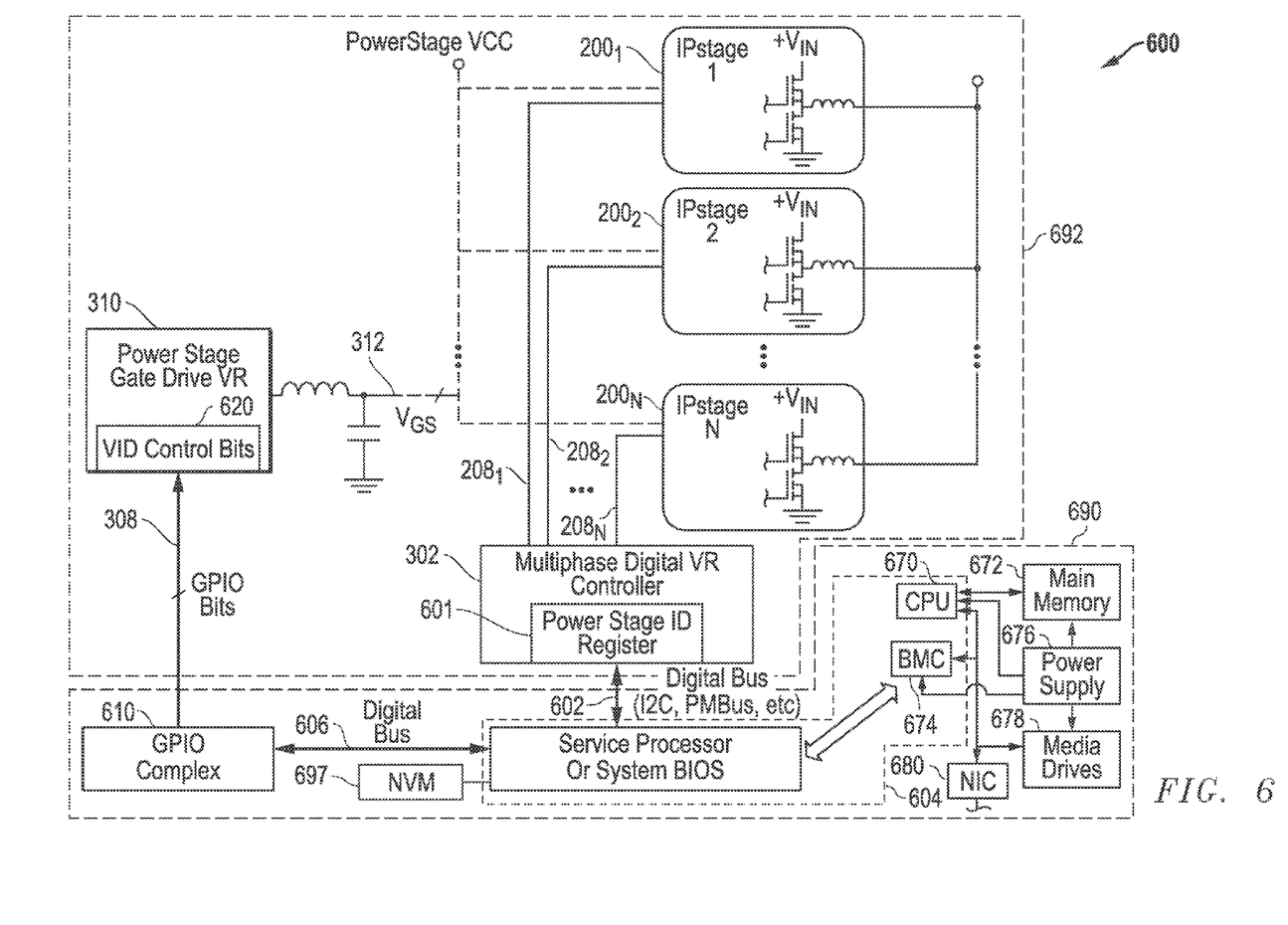
FIG. 6 illustrates a block diagram of a multi-phase VR system according to one exemplary embodiment of the disclosed methods and systems.
Figure 7:
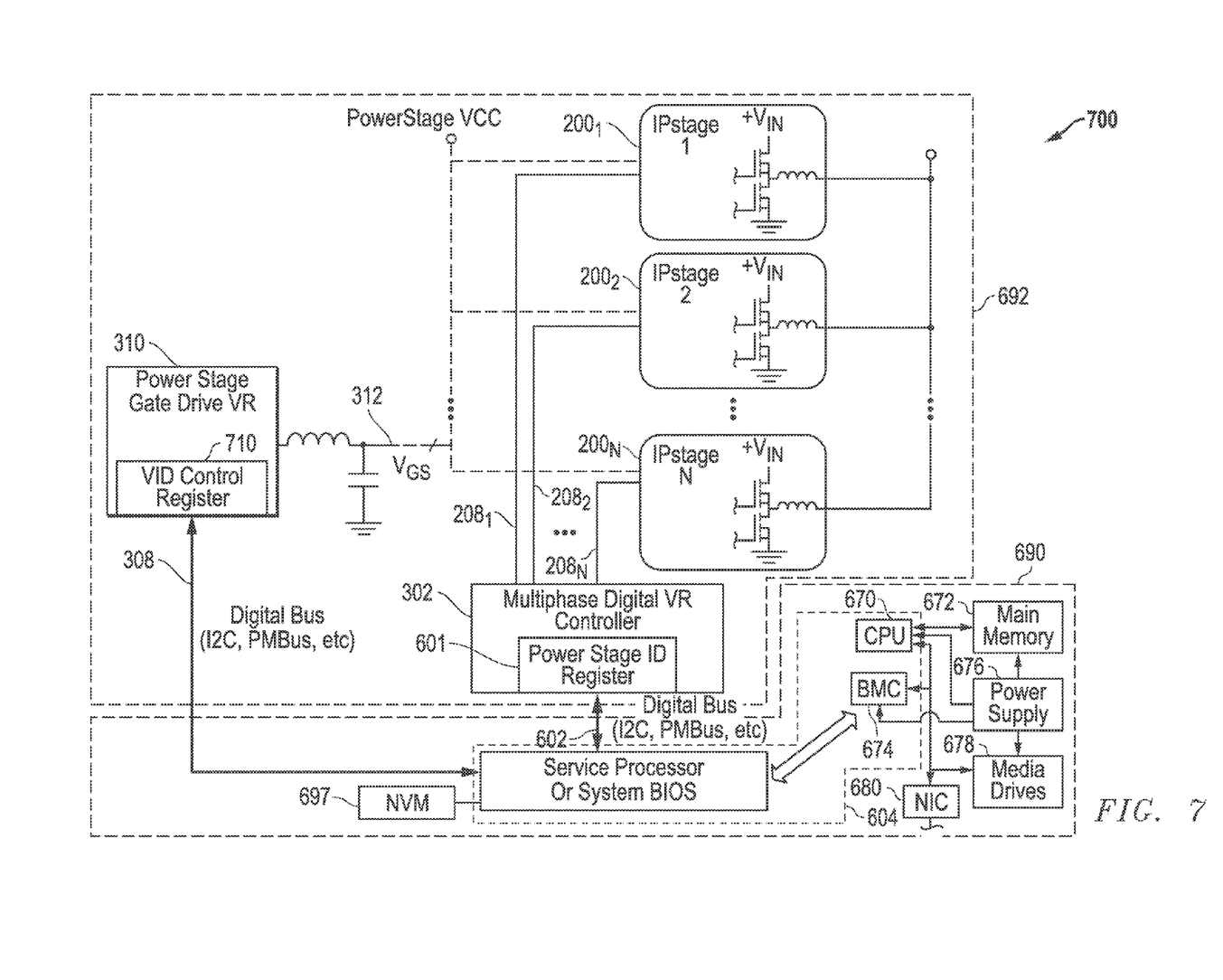
FIG. 7 illustrates a block diagram of a multi-phase VR system according to one exemplary embodiment of the disclosed methods and systems.

It will be understood that the particular steps of methodology 400 are exemplary only, and that any combination of fewer, additional and/or alternative steps, and/or any order of the illustrated steps, may be employed that is suitable for identifying one or more IPstage types and for selecting and providing a corresponding FET drive voltage corresponding to (e.g., optimized for) each identified IPstage type of a VR system such as VR system 300 or other configuration of VR system having one or more IPstages (e.g., including VR systems 500, 600 and 700 of FIGS. 5-7).

FIGS. 5-7 illustrate three possible exemplary embodiments of multi-phase VR system configurations, it being understood that other configurations are possible. As shown, in each of the embodiments of FIGS. 5-7, digital VR controller 302 is configured to recognize the identity of one or more of specific types of IPstage $200_1$ to $200_N$ via a respective power device identification pin signal/s $208_1$ to $208_N$. In the illustrated embodiments, VR controller 302 may be configured to either select a pre-selected optimized FET drive voltage based on the recognized identity of the IPstage/s 200 and directly provide a voltage control signal 308 to digital controller of gate drive VR 310, or may be configured to communicate a signal representative of the recognized identity of the IPstage/s 200 to another processing device (e.g., such as a system controller, system BIOS executing on host CPU, embedded controller, etc. of an information handling system) which itself may be configured to then provide a voltage control signal 308 to digital controller of gate drive VR 310.

In particular, FIG. 5 illustrates one exemplary embodiment of a multi-phase VR system 500 in which digital VR controller 302 is configured to query each of the smart IPstages $200_1$ to $200_N$ via respective power device identification pin signals $208_1$ to $208_N$, and to determine a pre-determined optimized or optimum power stage VCC level, e.g., from a lookup table stored in non-volatile memory that is accessible by the VR controller 302. It is configured to then use its own GPIO bits as control signal 308 to directly configure this voltage at the power stage gate drive VR, e.g., by toggling VID control bits (e.g., serial VID control bits) or other suitable voltage control input (e.g., such as variable voltage pin strapping, etc.). In the embodiment of FIG. 5, VR controller 302 is configured to directly adjust VCC bias output gate drive voltage 312 by communicating corresponding general-purpose input/output (GPIO) bits 308 as voltage identification (VID) control input bits to IPstage power stage gate drive VR 310 as shown.

FIG. 6 illustrates another exemplary embodiment of a multi-phase VR system 600 in which digital VR controller 302 is again configured to query each of the smart IPstages $200_1$ to $200_N$ via respective power device identification pin signals $208_1$ to $208_N$. However, in this embodiment, VR controller 302 is configured to store the determined power stage identification information into an internal IPstage ID register 601, e.g., as a single IPstage ID for all IPstages 200 when all IPstages 200 are of the same type, or as multiple different IPstage IDs when different types of respective IPstages 200 are present. As shown, internal IPstage ID register 601 may be accessible to a processing device 604 that is external and separate from the VR controller 302 via a digital communication bus 602 such as PMBus, I2C, etc. In one exemplary embodiment, such an external processing device 604 may be present as one of several components 690 of an information handling system such as a server or other computer that includes CPU 670, main memory 672, BMC or other service processor 674, power supply 676, media drives 678, network interface card (NIC) 680, etc. as shown.

Examples of possible types of external processing device 604 include, for example, a service processor (e.g., server system controller such as baseboard management controller "BMC" 674, or other type service processor such as remote access controller, etc.), CPU (e.g., CPU 670 executing system BIOS) of exemplary information handling system components 690 illustrated in FIG. 6. As shown, in this embodiment VR system components 692 may coupled together with the remaining information handling system components 690 (e.g., coupled together within a common information handling system chassis such as a 2U, 3U, etc. chassis) as part of a common information handling system.

Further examples of CPUs, service processors, remoter access controllers, server system controllers and configurations thereof may be found in United States Patent Application Publication Number 20120275610; U.S. patent application Ser. No. 13/477,837, filed May 22, 2012; U.S. patent application Ser. No. 13/618,666, filed Sep. 14, 2012; United States Patent Application Publication Number 2006/0212143; and United States Patent Application Publication Number 2006/0190532, each of the foregoing being incorporated herein by reference in its entirety. It will be understood that an external processing device that is coupled to access a memory register of a VR controller 302 may be any other suitable type of system controller or other processing device separate from the VR controller 302, e.g., such as for information handling system embodiments that are not servers.

In the exemplary embodiment of FIG. 6, external processing device 604 is configured to access the stored power stage identification information of register 601 via bus 602 and then to select a pre-determined optimized FET drive voltage based on this recognized identity, e.g., from a lookup table stored in optional non-volatile memory 697 that is accessible by external processing device 604. In this exemplary embodiment, external processing device 604 may in turn be configured to communicate via any suitable digital bus 606 with its own GPIO complex 610 to use GPIO bits as control signals 308 to toggle or otherwise manipulate power state VCC VR VID control bits 620 or other suitable voltage control input (e.g., such as variable voltage pin strapping, etc.) at IPstage power stage gate drive VR 310 to set the optimized or optimum gate drive voltage 312, e.g., in one embodiment as VCC bias output gate drive voltage 312 for the corresponding installed type/s power stages 200. The embodiment of FIG. 6 may be implemented, for example, to simplify VR controller 302 and its motherboard installation since lookup table memory is moved from the VR controller 302 to the level of the external processing device 604.

FIG. 7 illustrates another exemplary embodiment of a multi-phase VR system 700 in which digital VR controller 302 is again configured to query each of the smart IPstages $200_1$ to $200_N$ via respective power device identification pin signals $208_1$ to $208_N$. As in the embodiment of FIG. 6, VR controller 302 is configured to store the determined power stage identification information into an internal IPstage ID register 601, which is accessible to server external processing device 604 via a digital communication bus 602. External processing device 604 is configured to access the stored power stage identification information of register 601 via bus 602 and then to select a pre-determined optimized FET drive voltage control signal value based on this recognized identity, e.g., from a lookup table stored in non-volatile memory that is accessible by external processing device 604. In this embodiment, external processing device 604 may in turn be configured to write the desired or selected power stage gate drive VR (VCC VR VID) bit value/s corresponding to the selected optimized or optimum VCC bias output gate drive voltage 312 to a VID control register 710 in the IPstage power stage VCC VR 310 over a digital communication bus as voltage control signals 308, e.g., such as PMBus, I2C bus, etc.

It will be understood that one or more of the tasks, functions, or methodologies described herein (e.g., including those described for VR controller 302 and/or external processing device 604) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:
1. A system, comprising:
    at least one integrated power stage (IPstage) comprising a voltage input, a voltage output, one or more field effect transistor (FET) switching devices coupled between the voltage input and the voltage output to provide regulated power to the voltage output, and an IPstage identification (ID) recognition module having a power device identification signal output that is indicative of an identity of the at least one IPstage;
    at least one processing device coupled to control operation of the at least one IPstage, the at least one, processing device also being coupled to receive the power device identification signal output from the at least one IPstage;
    a power stage gate drive voltage regulator (VR) coupled between the at least one processing device and the at least one IPstage, the power stage gate drive VR being configured to provide a regulated gate drive voltage to drive the FET switching devices of the at least one IPstage;
    where the at least one processing device is configured to:
        receive the power device identification signal output from the at least one IPstage,
        determine a FET drive voltage control signal value based at least in part on the received power device identification signal, and
        provide the FET drive voltage control signal to control the power stage gate drive VR to provide a determined FET drive voltage to drive the FET switching devices of the at least one IPstage while controlling the at least one IPstage to provide power to the voltage output;

where the at least one processing device coupled to control operation of the at least one IPstage is configured as a VR system controller;

where the system further comprises memory accessible by the VR system controller having information indicative of a FET drive voltage control signal value that corresponds to the identified IPstage stored thereon together with information indicative of FET drive voltage control signal values for different types of IPstages;

where the VR system controller is also coupled to receive the power device identification signal output from the at least one IPstage with the power stage gate drive VR being coupled between the VR system controller and the at least one IPstage; where the memory comprises external non-volatile memory (NVM) coupled to the VR system controller, the NVM storing information indicative of FET drive voltage control signal values corresponding to multiple different types of IPstages that include the at least one IPstage; and where the VR controller is further configured to:
receive the power device identification signal output from the at least one IPstage,
determine the identity of the at least one IPstage based on the received power device identification signal,
retrieve information indicative of a FET drive voltage control signal value that corresponds to the identified IPstage from the NVM, and
provide the indicated FET drive voltage control signal value to the power stage gate drive VR; and where the power stage gate drive VR is configured to provide a regulated gate drive voltage based on the value of the retrieved FET drive voltage control signal provided by the VR controller to drive a gate of the FET switching devices of the at least one IPstage while the VR controller controls the at least one IPstage to provide power to the voltage output.

2. A system, comprising:
at least one integrated power stage (IPstage) comprising a voltage input, a voltage output, one or more field effect transistor (FET) switching devices coupled between the voltage input and the voltage output to provide regulated power to the voltage output, and an IPstage identification (ID) recognition module having a power device identification signal output that is indicative of an identity of the at least one IPstage;
at least one processing device coupled to control operation of the at least one IPstage, the at least one processing device also being coupled to receive the power device identification signal output from the at least one IPstage;
a power stage gate drive voltage regulator (VR) coupled between the at least one processing device and the at least one IPstage, the power stage gate drive VR being configured to provide a regulated gate drive voltage to drive the FET switching devices of the at least one IPstage;
where the at least one processing device is configured to:
receive the power device identification signal output from the at least one IPstage;
determine a FET drive voltage control signal value based at least in part on the received power device identification signal, and
provide the FET drive voltage control signal to control the power stage gate drive VR to provide a determined FET drive voltage to drive the FET switching devices of the at least one IPstage while controlling the at least one IP stage to provide power to the voltage output;

where the at least one processing device coupled to control operation of the at least one IPstage is configured as a VR system controller;

where the system further comprises memory accessible by the VR system controller having information indicative of a FET drive voltage control signal value that corresponds to the identified IPstage stored thereon together with information indicative of FET drive voltage control signal values for different types of IP stages;

where the VR system controller is also coupled to receive the power device identification signal output from the at least one IPstage with the power stage gate drive VR being coupled between the VR system controller and the at least one IPstage; where the memory comprises an internal memory register of the VR system controller that stores information indicative of FET drive voltage control signal values corresponding to multiple different types of IPstages that include the at least one IPstage; and where the VR controller is further configured to:
receive the power device identification signal output from the at least one IPstage,
determine the identity of the at least one IPstage based on the received power device identification signal,
retrieve information indicative of a FET drive voltage control signal value that corresponds to the identified IPstage from the internal memory register, and
provide the indicated FET drive voltage control signal value to the power stage gate drive VR; and where the power stage gate drive VR is configured to provide a regulated gate drive voltage based on the value of the retrieved FET drive voltage control signal provided by the VR controller to drive the gate of the FET switching devices of the at least one IPstage while the VR controller controls the at least one IPstage to provide power to the VR system voltage output.

3. The system of claim 2, where the FET switching devices comprise MOSFET switching devices.

4. A system, comprising:
at least one integrated power stage (IPstage) comprising a voltage input, a voltage output, one or more field effect transistor (FET) switching devices coupled between the voltage input and the voltage output to provide regulated power to the voltage output, and an IPstage identification (ID) recognition module having a power device identification signal output that is indicative of an identity of the at least one IPstage;
at least one processing device coupled to control operation of the at least one IPstage, the at least one processing device also being coupled to receive the power device identification signal output from the at least one IPstage;
a power stage gate drive voltage regulator (VR) coupled between the at least one processing device and the at least one IPstage, the power stage gate drive VR being configured to provide a regulated gate drive voltage to drive the FET switching devices of the at least one IPstage;
where the at least one processing device is configured to:
receive the power device identification signal output from the at least one IPstage, determine a FET drive voltage control signal value based at least in part on the received power device identification signal, and provide the FET drive voltage control signal to control the power stage gate drive VR to provide a determined FET drive voltage to drive the FET switching devices of the at least one IP stage while controlling the at least one IPstage to provide power to the voltage output;

where the at least one processing device coupled to control operation of the at least one IPstage is configured as a VR system controller;

where the system further comprises memory accessible by the VR system controller having information indicative of a FET drive voltage control signal value that corresponds to the identified IPstage stored thereon together with information indicative of FET drive voltage control signal values for different IPstages;

where each of the multiple different types of IPstages has different drain to source resistance in on-state characteristics as a function of gate drive voltage or gate-to-source voltage; and where the VR system controller is configured to identify and retrieve the information indicative of a FET drive voltage control signal value that corresponds to the identified type of IPstage from the memory.

5. A system, comprising:

at least one integrated power stage (IPstage) comprising a voltage input, a voltage output, one or more field effect transistor (FET) switching devices coupled between the voltage input and the voltage output to provide regulated power to the voltage output, and an IPstage identification (ID) recognition module having a power device identification signal output that is indicative of an identity of the at least one IPstage;

at least one processing device coupled to control operation of the at least one IPstage, the at least one processing device also being coupled to receive the power device identification signal output from the at least one IPstage;

a power stage gate drive voltage regulator (VR) coupled between the at least one processing device and the at least one IPstage, the power stage gate drive VR being configured to provide a regulated gate drive voltage to drive the FET switching devices of the at least one IP stage; and where the at least one processing device is configured to:
  receive the power device identification signal output from the at least one IPstage,
  determine a FET drive voltage control signal value based at least in part on the received power device identification signal, and
  provide the FET drive voltage control signal to control the power stage gate drive VR to provide a determined FET drive voltage to drive the FET switching devices of the at least one IPstage while controlling the at least one IPstage to provide power to the voltage output;

where the at least one processing device coupled to control operation of the at least one IPstage is configured as a VR system controller; where the VR system controller comprises an internal memory register configured to receive and store the power device identification signal output from the at least one IPstage; where each of the VR system controller and the power stage gate drive VR are configured to be coupled to at least one separate external processing device; where the VR system controller is configured to provide the at least one external processing device with access to the power device identification signal output from the at least one IPstage stored in the internal memory register; and where the power stage gate drive VR is configured to receive a FET drive voltage control signal value from the at least one external processing device that is based at least in part on information indicative of a FET drive voltage control signal value that corresponds to the identified type of IPstage retrieved from internal register of the VR controller by the at least one external processing device.

6. The system of claim 5, further comprising the at least one external processing device; and where the at least one external processing device is configured to:
  retrieve the stored IPstage power device identification signal output from the internal memory register of the VR system controller;
  determine a FET drive voltage control signal value based at least in part on the received power device identification signal; and
  provide the determined FET drive voltage control signal value to control the power stage gate drive VR to provide a determined FET drive voltage to drive the FET switching devices of the at least one IPstage.

7. The system of claim 6, where the at least one external processing device is service processor or a host CPU processing device executing system basic input/output system (BIOS).

8. A method of operating a voltage regulator (VR) system using at least one processing device, comprising:
  using the at least one processing device to control operation of at least one integrated power stage (IPstage) to provide regulated power to a voltage output of the VR system, the at least one IPstage also including a voltage input, and one or more field effect transistor (FET) switching devices coupled between the voltage input and the voltage output;
  using the at least one processing device to:
    receive a power device identification signal output from the at least one IPstage that is indicative of the identity of the at least one IPstage,
    determine a FET drive voltage control signal value based at least in part on the received power device identification signal, and
    provide the FET drive voltage control signal to a power stage gate drive VR;
  using the power stage gate drive VR to provide a determined regulated FET drive voltage based on the FET drive voltage control signal to drive the FET switching devices of the at least one IPstage while using the at least one processing device to control the at least one IPstage to provide power to the voltage output; and
  using the at least one processing device as a VR controller to identify and retrieve information indicative of a FET drive voltage control signal value that corresponds to the identified type of IPstage from memory accessible by the VR controller;
  where the memory comprises non-volatile memory (NVM); and where the method further comprises:
    using the at least one processing device as a VR controller to:
      control operation of the at least one IPstage to provide regulated power to a voltage output of the VR system,
      receive the power device identification signal output from the at least one IPstage, determine the identity of the at least one IPstage based on the received power device identification signal,
retrieve information indicative of a FET drive voltage control signal value that corresponds to the identified IPstage from the non-volatile memory (NVM) coupled to the VR controller,
provide the indicated FET drive voltage control signal value to the power stage gate drive VR; and
using the power stage gate drive VR to provide a regulated gate drive voltage based on the value of the retrieved FET drive voltage control signal provided by the VR controller to drive the gate of the FET switching devices of the at least one IPstage while using the VR controller to control the at least one IPstage to provide power to the VR system voltage output.

9. A method of operating a voltage regulator (VR) system using at least one processing device, comprising:
using the at least one processing device to control operation of at least one integrated power stage (IPstage) to provide regulated power to a voltage output of the VR system, the at least one IPstage also including a voltage input, and one or more field effect transistor (FET) switching devices coupled between the voltage input and the voltage output;
using the at least one processing device to:
receive a power device identification signal output from the at least one IPstage that is indicative of the identity of the at least one IPstage,
determine a FET drive voltage control signal value based at least in part on the received power device identification signal, and
provide the FET drive voltage control signal to a power stage gate drive VR;
using the power stage gate drive VR to provide a determined regulated FET drive voltage based on the FET drive voltage control signal to drive the FET switching devices of the at least one IPstage while using the at least one processing device to control the at least one IPstage to provide power to the voltage output; and
using the at least one processing device as a VR controller to identify and retrieve information indicative of a FET drive voltage control signal value that corresponds to the identified type of IPstage from memory accessible by the VR controller;
where the memory comprises an internal memory register of the VR controller; and where the method further comprises:
using the at least one processing device as a VR controller to:
receive the power device identification signal output from the at least one IPstage,
determine the identity of the at least one IPstage based on the received power device identification signal,
retrieve information indicative of a FET drive voltage control signal value that corresponds to the identified IPstage from the internal memory register of the VR controller, and
provide the indicated FET drive voltage control signal value to the power stage gate drive VR; and
using the power stage gate drive VR to provide a regulated gate drive voltage based on the value of the retrieved FET drive voltage control signal provided by the VR controller to drive a gate of the FET switching devices of the at least one IPstage while using the VR controller to control the at least one IPstage to provide power to the VR system voltage output.

10. The method of claim 9, where the FET switching devices comprise MOSFET switching devices.

11. A method of operating a voltage regulator (VR) system using at least one processing device, comprising:
using the at least one processing device to control operation of at least one integrated power stage (IPstage) to provide regulated power to a voltage output of the VR system, the at least one IPstage also including a voltage input, and one or more field effect transistor (FED) switching devices coupled between the voltage input and the voltage output;
using the at least one processing device to:
receive a power device identification signal output from the at least one IPstage that is indicative of the identity of the at least one IPstage;
determine a FET drive voltage control signal value based at least in part on the received power device identification signal, and
provide the FET drive voltage control signal to a power stage gate drive VR;
using the power stage gate drive VR to provide a determined regulated FET drive voltage based on the FET drive voltage control signal to drive the FET switching devices of the at least one IPstage while using the at least one processing device to control the at least one IPstage to provide power to the voltage output; and
using the at least one processing device as a VR controller to identify and retrieve information indicative of a FET drive voltage control signal value that corresponds to the identified type of IPstage from memory accessible by the VR controller;
where the memory accessible by the VR controller also stores information indicative of FET drive voltage control signal values for different types of IPstages, each of the multiple different types of IPstages has different drain to source resistance in on-state characteristics as a function of gate drive voltage or gate-to-source voltage.

12. A method of operating a voltage regulator (VR) system using at least one processing device, comprising:
using the at least one processing device to control operation of at least one integrated power stage (IPstage) to provide regulated power to a voltage output of the VR system, the at least one IPstage also including a voltage input, and one or more field effect transistor (FET) switching devices coupled between the voltage input and the voltage output;
using the at least one processing device to:
receive a power device identification signal output from the at least one IPstage that is indicative of the identity of the at least one IPstage,
determine a FET drive voltage control signal value based at least in part on the received power device identification signal, and
provide the FET drive voltage control signal to a power stage gate drive VR;
using the power stage gate drive VR to provide a determined regulated FET drive voltage based on the FET drive voltage control signal to drive the FET switching devices of the at least one IPstage while using the at least one processing device to control the at least one IP stage to provide power to the voltage output;
using the at least one processing device as a VR controller to receive and store the power device identification signal output from the at least one IPstage in an internal memory register of the VR controller;

using at least one separate external processing device to:
retrieve the stored IPstage power device identification signal output from the internal memory register of the VR system controller,
determine a FET drive voltage control signal value based at least in part on the received power device identification signal, and
provide the determined FET drive voltage control signal value to the power stage gate drive VR; and using the power stage gate drive VR to provide a determined regulated FET drive voltage based on the determined FET drive voltage control signal value to drive the FET switching devices of the at least one IPstage while using the at least one processing device to control the at least one IPstage to provide power to the voltage output.

13. The method of claim 12, where the at least one external processing device is a service processor or a host CPU processing device executing system basic input/output system (BIOS).

14. An information handling system, comprising:
at least one integrated power stage (IPstage) comprising a voltage input, a voltage output, one or more field effect transistor (FET) switching devices coupled between the voltage input and the voltage output to provide regulated power to the voltage output, and an IPstage identification (ID) recognition module having a power device identification signal output that is indicative of the identity of the at least one IPstage;
at least one processing device configured as a voltage regulator (VR) system controller that is coupled to control operation of the at least one IPstage, the VR controller also being coupled to receive the power device identification signal output from the at least one IPstage;
a power stage gate drive VR coupled between the VR controller and the at least one IPstage, the power stage gate drive VR being configured to provide a regulated gate drive voltage to drive the FET switching devices of the at least one IPstage; and
at least one processing device configured to:
determine a FET drive voltage control signal value based at least in part on the received power device identification signal, and
provide the FET drive voltage control signal to control the power stage gate drive VR to provide a determined FET drive voltage to drive the FET switching devices of the at least one IPstage while controlling the at least one IPstage to provide power to the voltage output; and
memory accessible by the VR system controller having information indicative of a FET drive voltage control signal value that corresponds to the identified IPstage stored thereon together with information indicative of FET drive voltage control signal values for different types of IPstages;
where the memory further comprises at least one of non-volatile memory coupled to the VR controller or an internal memory register provided within the VR controller, at least one of the NVM or the internal memory register storing information indicative of PET drive voltage control signal values corresponding to multiple different types of IPstages that include the at least one IPstage; and where the VR controller is further configured to:
determine the identity of the at least one IPstage based on the received power device identification signal,
retrieve information indicative of a FET drive voltage control signal value that corresponds to the identified IPstage from the NVM or internal memory register, and
provide the indicated FET drive voltage control signal value to the power stage gate drive VR; and
where the power stage gate drive VR is configured to provide a regulated gate drive voltage based on the value of the retrieved FET drive voltage control signal provided by the VR controller to drive a gate of the FET switching devices of the at least one IPstage while the VR controller controls the at least one IPstage to provide power to the voltage output.

15. An information handling system, comprising:
at least one integrated power stage (IPstage) comprising a voltage input, a voltage output one or more field effect transistor (FET) switching devices coupled between the voltage input and the voltage output to provide regulated power to the voltage output, and an IPstage identification (ID) recognition module having a power device identification signal output that is indicative of the identity of the at least one IPstage;
at least one processing device configured as a voltage regulator (VR) system controller that is coupled to control operation of the at least one IPstage, the VR controller also being coupled to receive the power device identification signal output from the at least one IPstage;
a power stage gate drive VR coupled between the VR controller and the at least one IPstage, the power stage gate drive VR being configured to provide a regulated gate drive voltage to drive the FET switching devices of the at least one IPstage; and
at least one processing device configured to:
determine a FET drive voltage control signal value based at least in part on the received power device identification signal, and
provide the FET drive voltage control signal to control the power stage gate drive VR to provide a determined FET drive voltage to drive the FET switching devices of the at least one IPstage while controlling the at least one IPstage to provide power to the voltage output; and
memory accessible by the VR system controller having information indicative of a FET drive voltage control signal value that corresponds to the identified IPstage stored thereon together with information indicative of FET drive voltage control signal values for different types of IPstages;
where each of the different types of IPstages have different drain to source resistance in on-state characteristics as a function of gate drive voltage or gate-to-source voltage; and where the VR system controller is configured to identify and retrieve the information indicative of a FET drive voltage control signal value that corresponds to the identified type of IPstage from the memory.

16. An information handling system, comprising:
at least one integrated power stage (IPstage) comprising a voltage input, a voltage output, one or more field effect transistor (FET) switching devices coupled between the voltage input and the voltage output to provide regulated power to the voltage output, and an IPstage identification (ID) recognition module having a power device identification signal output that is indicative of the identity of the at least one IPstage;

at least one processing device configured as a voltage regulator (VR) system controller that is coupled to control operation of the at least one IPstage, the VR controller also being coupled to receive the power device identification signal output from the at least one IP stage;

a power stage gate drive VR coupled between the VR controller and the at least one IPstage, the power stage gate drive VR being configured to provide a regulated gate drive voltage to drive the FET switching devices of the at least one IP stage; and at least one processing device configured to:
  determine a FET drive voltage control signal value based at least in part on the received power device identification signal, and
  provide the FET drive voltage control signal to control the power stage gate drive VR to provide a determined FET drive voltage to drive the FET switching devices of the at least one IPstage while controlling the at least one IPstage to provide power to the voltage output; and at least one processing device that is separate and external to the VR system controller; where the VR system controller comprises an internal memory register configured to receive and store the power device identification signal output from the at least one IPstage; where each of the VR system controller and the power stage gate drive VR are coupled to the at least one separate external processing device; and where the at least one external processing device is configured to:
  retrieve the stored IPstage power device identification signal output from the internal memory register of the VR system controller,
  determine a FET drive voltage control signal value based at least in part on the retrieved power device identification signal, and
  provide the determined FET drive voltage control signal value to control the power stage gate drive VR to provide a determined FET drive voltage to drive the FET switching devices of the at least one IPstage.

17. The information handling system of claim 16, where the at least one external processing device is service processor or a host CPU processing device executing system basic input/output system (BIOS).

* * * * *